United States Patent
Matsumura et al.

(10) Patent No.: US 12,543,171 B2
(45) Date of Patent: Feb. 3, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 517 days.

(21) Appl. No.: 18/016,196

(22) PCT Filed: Jul. 31, 2020

(86) PCT No.: PCT/JP2020/029547
§ 371 (c)(1),
(2) Date: Jan. 13, 2023

(87) PCT Pub. No.: WO2022/024377
PCT Pub. Date: Feb. 3, 2022

(65) Prior Publication Data
US 2023/0276435 A1  Aug. 31, 2023

(51) Int. Cl.
*H04W 72/1268* (2023.01)
*H04W 16/28* (2009.01)
*H04W 72/0453* (2023.01)

(52) U.S. Cl.
CPC ....... *H04W 72/1268* (2013.01); *H04W 16/28* (2013.01); *H04W 72/0453* (2013.01)

(58) Field of Classification Search
CPC ............. H04W 72/1268; H04W 16/28; H04W 72/0453; H04W 72/232; H04W 72/23;
(Continued)

(56) References Cited

U.S. PATENT DOCUMENTS

2020/0100154 A1   3/2020  Cirik et al.
2020/0145062 A1*  5/2020  Jung ..................... H04W 72/23
(Continued)

FOREIGN PATENT DOCUMENTS

CN   111344994 A   6/2020
CN   111357239 A   6/2020

OTHER PUBLICATIONS

International Search Report issued in PCT/JP2020/029547 on Dec. 22, 2020 (2 pages).
(Continued)

*Primary Examiner* — Thai Nguyen
(74) *Attorney, Agent, or Firm* — Osha Bergman Watanabe & Burton LLP

(57) ABSTRACT

A terminal according to an aspect of the present disclosure includes a receiving section that receives a first media access control-control element (MAC CE) indicating one or more first transmission configuration indication (TCI) states activated for a physical downlink shared channel (PDSCH) and receives a second MAC CE indicating one or more second TCI states activated for a physical uplink shared channel (PUSCH), and a control section that applies the one or more second TCI states indicated by the second MAC CE to the PUSCH. According to an aspect of the present disclosure, beams can be appropriately notified.

8 Claims, 15 Drawing Sheets

EXAMPLE 2

(58) Field of Classification Search
CPC .. H04B 7/06968; H04B 7/0695; H04B 7/088; H04B 7/06952; H04L 5/0044; H04L 5/0091; H04L 5/0023
See application file for complete search history.

(56) References Cited

U.S. PATENT DOCUMENTS

2021/0014931 A1* 1/2021 Noh ............... H04L 5/0035
2023/0081293 A1 3/2023 Li
2023/0103557 A1 4/2023 Li

OTHER PUBLICATIONS

Written Opinion of the International Searching Authority issued in PCT/JP2020/029547 on Dec. 22, 2020 (3 pages).

Moderator (OPPO); "Summary of email thread [101-e-NR-eMIMO-multiTRP-02]"; 3GPP TSG RAN WG1 #101, R1-2004908; e-Meeting; May 20-Jun. 5, 2020 (12 pages).

vivo; "Further discussion on Multi-Beam Operation", 3GPP TSG RAN WG1 #98m R1-1908167; Prague, CZ; Aug. 26-30, 2019 (12 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Japanese Patent Application No. 2022-539970, mailed on May 21, 2024 (6 pages).

Office Action issued in Chinese Patent Application No. 202080105799.4, dated Sep. 23, 2024 (11 pages).

3GPP TSG RAN WG1 #100bis; R1-2001678; vivo; "Discussion on remaining issues on multi-TRP operation"; e-Meeting, Apr. 20-30, 2020 (17 pages).

* cited by examiner

Enhanced TCI States Activation/Deactivation for UE-specific PDSCH MAC CE

| R | Serving Cell ID | BWP ID | Oct. 1 |
|---|---|---|---|
| $C_1$ | TCI state $ID_{0,1}$ | | Oct. 2 |
| R | TCI state $ID_{0,2}$ | | Oct. 3 (Optional) |

...

| $C_N$ | TCI state $ID_{N,1}$ | Oct. M-1 |
|---|---|---|
| R | TCI state $ID_{N,2}$ | Oct. M (Optional) |

FIG. 2

EXAMPLE

| R | Serving Cell ID | BWP ID | Oct. 1 |
|---|---|---|---|
| $C_0$ | R | TCI state $ID_{0,1}$ | Oct. 2 |
| R | R | TCI state $ID_{0,2}$ | Oct. 3 |

...

| $C_X$ | R | TCI state $ID_{X,1}$ | Oct. N-1 |
|---|---|---|---|
| R | R | TCI state $ID_{X,2}$ | Oct. N |

FIG. 5

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a user terminal (terminal, User Equipment (UE)) controls transmission and reception by using beams (transmission configuration indication (TCI) state/quasi-co-location (QCL) assumption).

However, latency/overhead in indication of beams for a downlink (DL)/uplink (UL) may deteriorate communication quality/throughput.

In view of this, the present disclosure has one object to provide a terminal, a radio communication method, and a base station in which beams are appropriately notified.

Solution to Problem

A terminal according to an aspect of the present disclosure includes a receiving section that receives a first media access control-control element (MAC CE) indicating one or more first transmission configuration indication (TCI) states activated for a physical downlink shared channel (PDSCH) and receives a second MAC CE indicating one or more second TCI states activated for a physical uplink shared channel (PUSCH), and a control section that applies the one or more second TCI states indicated by the second MAC CE to the PUSCH.

Advantageous Effects of Invention

According to an aspect of the present disclosure, beams can be appropriately notified.

BRIEF DESCRIPTION OF DRAWINGS

FIG. 2 is a diagram to show an example of an enhanced TCI states activation/deactivation for UE-specific PDSCH MAC CE;

FIG. 5 is a diagram to show an example of a MAC CE of notification method 1-3;

Figure 1:
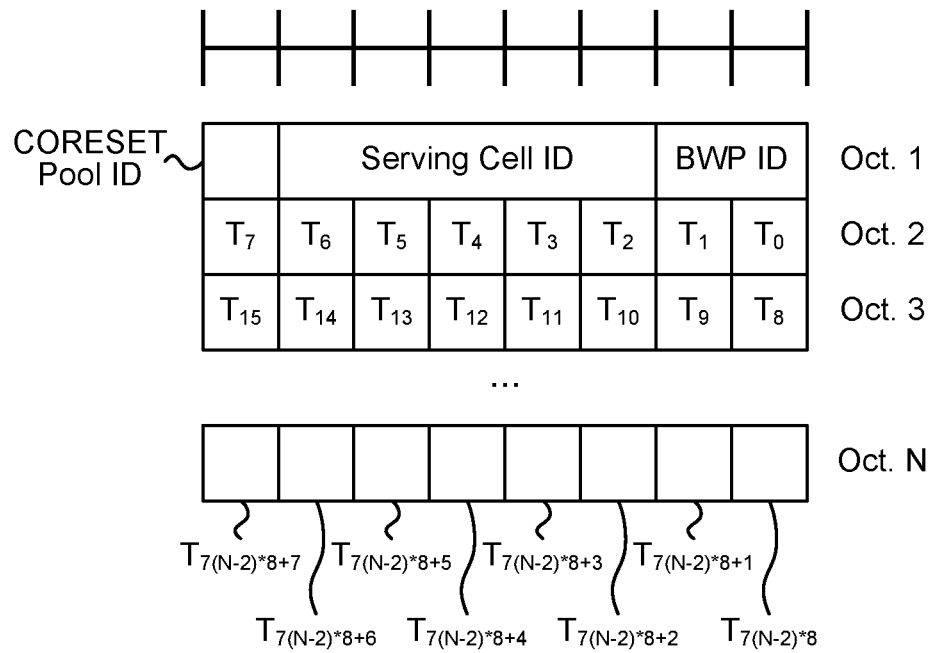
FIG. 1 is a diagram to show an example of a TCI states activation/deactivation for UE-specific PDSCH MAC CE.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is referred to as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS for QCL type X for the TCI state may mean the RS in the QCL type X relation with (the DMRS for) a given channel/signal, and the RS may be referred to as a QCL source of the QCL type X for the TCI state.

(Default TCI State/Default Spatial Relation/Default PL-RS)

When a time offset between reception of DL DCI (DCI for scheduling a PDSCH) and its corresponding PDSCH (a PDSCH scheduled by the DCI) is smaller than a threshold (timeDurationForQCL) (application condition, first condition) in both of a case in which information of TCI in DCI (a higher layer parameter TCI-PresentInDCI) is set to "enabled" and a case in which the information of TCI in DCI is not configured in an RRC connected mode and non cross-carrier scheduling is employed, the TCI state (default TCI state) of the PDSCH may be a TCI state of the lowest CORESET ID in the latest slot in an active DL BWP of the CC (of a specific UL signal). Otherwise, the TCI state (default TCI state) of the PDSCH may be a TCI state of the lowest TCI state ID of the PDSCH in an active DL BWP of the CC scheduled.

In Rel. 15, individual MAC CEs for a MAC CE for activation/deactivation of PUCCH spatial relation and a MAC CE for activation/deactivation of SRS spatial relation are required. PUSCH spatial relation conforms to SRS spatial relation.

In Rel. 16, at least one of the MAC CE for activation/deactivation of PUCCH spatial relation and the MAC CE for activation/deactivation of SRS spatial relation need not be used.

If, in FR2, neither the spatial relation nor the PL-RS for the PUCCH is configured (application condition, second condition), default assumptions of the spatial relation and the PL-RS (a default spatial relation and a default PL-RS) are applied to the PUCCH. If, in FR2, neither the spatial relation nor the PL-RS for the SRS (an SRS resource for the SRS, or an SRS resource corresponding to an SRS resource indicator (SRI) in DCI format 0_1 for scheduling the PUSCH) is configured (application condition, second condition), default assumptions of the spatial relation and the PL-RS (a default spatial relation and a default PL-RS) are applied to the PUSCH scheduled by DCI format 0_1 and the SRS.

If CORESETs are configured in the active DL BWP in the CC, the default spatial relation and the default PL-RS may be the TCI state or the QCL assumption of the CORESET having the lowest CORESET ID in the active DL BWP. If CORESETs are not configured in the active DL BWP in the CC, the default spatial relation and the default PL-RS may be the active TCI state having the lowest ID of the PDSCH in the active DL BWP.

In Rel. 15, the spatial relation of the PUSCH scheduled by DCI format 0_0 conforms to the spatial relation of the PUCCH resource having the lowest PUCCH resource ID among active spatial relations of the PUCCH in the same CC. Even when the PUCCH is not transmitted in an SCell, a network needs to update all of the PUCCH spatial relations in the SCell.

In Rel. 16, PUCCH configuration for the PUSCH scheduled by DCI format 0_0 is not required. When there is no active PUCCH spatial relation or there is no PUCCH resource in the active UL BWP in the CC for the PUSCH scheduled by DCI format 0_0 (application condition, second condition), the default spatial relation and the default PL-RS are applied to the PUSCH.

The above threshold may be referred to as a time duration for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

The number of bits of an SRS resource indicator (SRI) field in DCI format 0_1 depend on the number of SRS resources configured (for use of codebook transmission/non codebook transmission).

(Multi TRP)

In NR, a scheme in which one or a plurality of transmission/reception points (TRPs) (multi TRP (MTRP)) perform DL transmission to the UE by using one or a plurality of panels (multi panel) has been under study. A scheme in which the UE performs UL transmission to one or a plurality of TRPs by using one or a plurality of panels has been under study.

Note that the plurality of TRPs may correspond to the same cell identifier (ID), or may correspond to different cell IDs. The cell ID may be a physical cell ID, or may be a virtual cell ID.

The multi TRP (for example, TRPs #1 and #2) are connected with an ideal/non-ideal backhaul, and information, data, and the like may be exchanged therebetween. Different code words (CWs) and different layers may be transmitted from each TRP of the multi TRP. As one mode of multi TRP transmission, non-coherent joint transmission (NCJT) may be used.

In NCJT, for example, TRP #1 performs modulation mapping of a first code word and performs layer mapping so as to transmit a first PDSCH by using first precoding for a first number of layers (for example, two layers). TRP #2 performs modulation mapping of a second code word and performs layer mapping so as to transmit a second PDSCH by using second precoding for a second number of layers (for example, two layers).

Note that it may be defined that a plurality of PDSCHs (multi PDSCH) transmitted by NCJT partially or entirely overlap in at least one of time and frequency domains. In other words, at least one of the time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multi PDSCH may be interpreted as simultaneous reception of PDSCHs that are not of a given QCL type (for example, QCL type D).

The plurality of PDSCHs (which may be referred to as multi PDSCH (multiple PDSCHs)) from the multi TRP may be scheduled using one DCI (single DCI, single PDCCH) (single master mode). The plurality of PDSCHs from the multi TRP may be scheduled respectively using a plurality of DCIs (multi DCI, multi PDCCH (multiple PDCCHs)) (multi master mode).

According to the multi TRP scenario as described above, more flexible transmission control using a channel having satisfactory quality can be performed.

In order to support multi TRP transmission within a cell ("intra-cell", having the same cell ID) and among cells ("inter-cell", having different cell IDs) based on a plurality of PDCCHs, in RRC configuration information for linking a plurality of pairs of PDCCHs and PDSCHs having a plurality of TRPs, one control resource set (CORESET) in PDCCH configuration information (PDCCH-Config) may correspond to one TRP.

(Unified TCI Framework)

A unified TCI framework for beam indication in the DL and the UL has been under study.

A TCI states activation/deactivation for UE-specific PDSCH MAC CE of FIG. 1 includes a CORESET pool ID field, a serving cell ID field, a BWP ID field, and a $T_i$ field.

When the $T_i$ field is set to 1, it is indicated that the TCI state having TCI state ID i is activated and is mapped to a code point of the TCI field of the DCI. The code point to which the TCI state is mapped is determined by the position indicating order in all of the TCI states with the $T_i$ field being set to 1. The CORESET pool ID indicates that mapping between the activated TCI state and the code point of the TCI of the DCI set by the $T_i$ field is specific to the CORESET configured with the CORESET pool ID.

The MAC CE is used for PDSCH reception of multi TRP based on the multi DCI and PDSCH reception of single TRP.

An enhanced TCI states activation/deactivation for UE-specific PDSCH MAC CE of FIG. 2 includes a reserved (R) field (reserved bit), a serving cell ID field, a BWP ID field, a $C_i$ field, and a TCI state $ID_{i,j}$ field.

The $C_i$ field indicates whether or not there is an octet including the TCI state $ID_{i,2}$ field. The TCI state $ID_{i,j}$ field indicates the j-th TCI state that is indicated for the i-th code point in the TCI field of the DCI. The TCI code point to which the TCI state is mapped is determined by the position indicating order in all of the TCI code points with a set of TCI state fields.

The MAC CE is used for PDSCH reception of multi TRP based on single DCI.

At least one of the TCI states activation/deactivation for UE-specific PDSCH MAC CE (FIG. 1) and the enhanced TCI states activation/deactivation for UE-specific PDSCH MAC CE (FIG. 2) may be referred to as a MAC CE of Rel. 16, or may be referred to as a TCI states for PDSCH MAC CE.

RRC signaling may configure new spatial relation information (for example, SpatialRelationInfo-r17). The spatial relation information may be used for the spatial relation or the QCL assumption between a reference RS (for example, an SSB/CSI-RS/SRS) and a target RS (for example, a DMRS of a PUCCH or a PUSCH, a PRACH, a UL RS such as an SRS). The spatial relation information may include at least one of a spatial relation information ID, a serving cell ID, and a reference signal. The reference signal may include any one of an SSB index, a CSI-RS index (NZP-CSI-RS resource ID), and an SRS (an SRS resource ID and a BWP ID of a UL BWP).

In addition to the RRC signaling, the MAC CE may be used for activation/deactivation of the spatial relation information for the SRS and the PUCCH and the SRS. L1 signaling (DCI) may be used for dynamic indication (of the spatial relation information) for at least one of an aperiodic (A)-SRS, the PUSCH, the PRACH, and the PUCCH. A new field in the DCI format may be used for dynamic indication for PDCCH indicated (PDCCH ordered) PRACH. A new field in a DL grant may be used for dynamic indication for the PUCCH.

64 pieces of spatial relation information can be configured for the PUCCH (spatialRelationInfoToAddModList in PUCCH-Config). When the unified TCI framework is used, at least 64 pieces of spatial relation information (for example, SpatialRelationInfo-r17) are required. With DCI overhead being taken into consideration for the PUSCH, it is considered that a subset of pieces of spatial relation information for the PUSCH is activated via the MAC CE, and the DCI indicates one piece of spatial relation information for the PUSCH out of the activated pieces of spatial relation information. For example, the MAC CE is used to activate M pieces of spatial relation information, and the DCI of m bits is used to select one of the M pieces. For example, when M is 2, m is 1.

However, latency/overhead in indication of beams for the downlink (DL)/uplink (UL) may deteriorate communication quality/throughput.

In view of this, the inventors of the present invention came up with the idea of a method of beam indication for DL/UL.

Embodiments according to the present disclosure will be described in detail with reference to the drawings as follows. The configurations to be described in respective embodiments may each be employed individually, or may be employed in combination.

In the present disclosure, "A/B" and "at least one of A and B" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, an RRC, an RRC parameter, an RRC message, a higher layer parameter, an information element (IE), and a configuration may be interchangeably interpreted. In the present disclosure, to support, to control, to be able to control, to operate, and to be able to operate may be interchangeably interpreted.

In the present disclosure, activate, update, indicate, enable, and specify may be interchangeably interpreted.

In the present disclosure, a MAC CE, an update command, and an activation/deactivation command may be interchangeably interpreted.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a TCI state, QCL assumption, a QCL parameter, a spatial domain reception filter, a UE spatial domain reception filter, a UE receive beam, a DL beam, a DL receive beam, DL precoding, a DL precoder, a DL-RS, QCL type D of a TCI state, an RS of QCL type D of a TCI state, an RS of QCL type D of a TCI state or QCL assumption, an RS of QCL type A of a TCI state or QCL assumption, spatial relation, a spatial domain transmission filter, a UE spatial domain transmission filter, a UE transmit beam, a UL beam, a UL transmit beam, UL precoding, and a UL precoder may be interchangeably interpreted. In the present disclosure, a QCL type X-RS, a DL-RS associated with QCL type X, a DL-RS having QCL type X, a source of a DL-RS, an SSB, and a CSI-RS may be interchangeably interpreted.

In the present disclosure, a UL TCI state and a unified TCI state that can be used for a UL channel/RS (for example, a PUCCH/PUSCH/SRS/UL DMRS) may be interchangeably interpreted. In the present disclosure, a TCI state for UL and new spatial relation information (for example, spatioalRelationInfo-r17) may be interchangeably interpreted. In the present disclosure, a TCI state ID and a new spatial relation information ID (for example, spatioalRelationInfoID-r17) may be interchangeably interpreted.

In the present disclosure, information related to a spatial relation between a reference RS and a target RS, information related to a UL TCI state, information related to a TCI state shared between the DL and the UL, and information related to a unified TCI state may be interchangeably interpreted.

In the present disclosure, a panel, an Uplink (UL) transmission entity, a TRP, a spatial relation, a control resource set (CORESET), a PDSCH, a code word, a base station, an antenna port of a given signal (for example, a demodulation reference signal (DMRS) port), an antenna port group of a given signal (for example, a DMRS port group), a group for multiplexing (for example, a code division multiplexing (CDM) group, a reference signal group, a CORESET group), a CORESET pool, a CW, a redundancy version (RV), and a layer (a MIMO layer, a transmission layer, a spatial layer) may be interchangeably interpreted. A panel Identifier (ID) and a panel may be interchangeably interpreted. In the present disclosure, a TRP ID and a TRP may be interchangeably interpreted.

In the present disclosure, the UE configured with a plurality of TRPs may determine at least one of the TRP corresponding to the DCI, the TRP corresponding to the PDSCH or UL transmission (the PUCCH, the PUSCH, the SRS, or the like) scheduled by the DCI, and the like, based on at least one of the following.

Value in a given field (for example, a field for indicating the TRP, an antenna port field, a PRI) included in the DCI
  DMRS (for example, a sequence of the DMRS, resources thereof, a CDM group, a DMRS port, a DMRS port group, an antenna port group, or the like) corresponding to the scheduled PDSCH/PUSCH
  DMRS (for example, a sequence of the DMRS, resources thereof, a CDM group, a DMRS port, a DMRS port group, or the like) corresponding to the PDCCH on which the DCI is transmitted
  CORESET (for example, a CORESET pool ID of the CORESET, an ID of the CORESET, a scrambling ID (which may be interpreted as a sequence ID), resources, or the like) in which the DCI is received
  RS (RS related group or the like) used for the TCI state, the QCL assumption, the spatial relation information, or the like In the present disclosure, the single PDCCH (DCI) may be referred to as a PDCCH (DCI) of a first scheduling type (for example, scheduling type A (or type 1)). The multi PDCCH (DCI) may be referred to as a PDCCH (DCI) of a second scheduling type (for example, scheduling type B (or type 2)).

In the present disclosure, it may be assumed that the single PDCCH is supported when the multi TRPs use the ideal backhaul. It may be assumed that the multi PDCCH is supported when the multi TRPs use the non-ideal backhaul.

Note that the ideal backhaul may be referred to as DMRS port group type 1, reference signal related group type 1, antenna port group type 1, CORESET pool type 1, or the like. The non-ideal backhaul may be referred to as DMRS port group type 2, reference signal related group type 2, antenna port group type 2, CORESET pool type 2, or the like. Terms are not limited to these.

In the present disclosure, a multi TRP, a multi TRP system, multi TRP transmission, and a multi PDSCH may be interchangeably interpreted. In the present disclosure, a single DCI, a single PDCCH, a multi TRP system based on a single DCI, activation of two TCI states in at least one TCI code point, and association of one DCI with two TCI states may be interchangeably interpreted. In the present disclosure, a multi DCI, a multi PDCCH, a multi TRP system based on a multi DCI, configuration of a CORESET pool index (for a CORESET), and association of two DCIs with two TCI states may be interchangeably interpreted. A single TRP, a single TRP system, a single TRP transmission, a single PDSCH, and no association of two or more TCI states in a TCI code point and no configuration of a CORESET pool index may be interchangeably interpreted.

(Radio Communication Method)

First Embodiment

Different MAC CEs may be used for PDSCH TCI states and PUSCH TCI states. A new MAC CE for activation of the PUSCH TCI states may be introduced. The new MAC CE may have a new logical channel ID (LCID).

The new MAC CE may conform to at least one of the following notification methods 1-1 to 1-3. Notification methods 1-1 to 1-3 may be the same MAC CE, or at least one of notification methods 1-1 to 1-3 may be different from the other MAC CE(s). Single TRP PUSCH transmission may be PUSCH transmission using systems of Rel. 15.

<<Notification Method 1-1>>

The new MAC CE may be a MAC CE for single TRP PUSCH transmission.

For the single TRP PUSCH transmission, the MAC CE may activate X TCI states for the PUSCH out of the TCI states configured using RRC. The activated TCI states may be mapped to code points of the DCI field indicating the PUSCH TCI.

The maximum number of TCI states activated for the PUSCH may be defined in a specification. For example, the maximum number of TCI states activated may be 2, 4, 8, or a number other than these.

Example 1

Figure 3A:
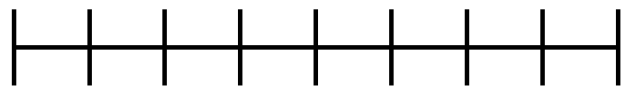
FIGS. 3A and 3B are each a diagram to show an example of a MAC CE of notification method 1-1.

In the example of FIG. 3A, the MAC CE includes an R field, a serving cell ID field, a BWP ID field, and a $T_i$ field.

When the $T_i$ field is set to 1, it may be indicated that the TCI state having TCI state ID i is activated and is mapped to a DCI code point indicating the TCI state for the PUSCH. The first TCI state with the $T_i$ field being set to 1 may be mapped to code point value 0. The n-th TCI state with the $T_i$ field being set to 1 may be mapped to code point value n−1.

The maximum number of $T_i$ fields being set to 1 may be in accordance with a specification or an RRC configuration. For example, the number may be restricted to 8 per BWP.

A MAC CE size may depend on the number of TCI states configured for the UL in an RRC information element (IE). In the present example, 64 TCI states are configured.

Example 2

Figure 3B:
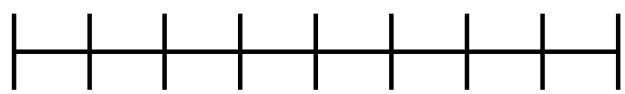

In the example of FIG. 3B, the MAC CE includes an R field, a serving cell ID field, a BWP ID field, and a TCI state $ID_i$ field.

The TCI state $ID_i$ field may indicate the TCI state that is activated and is mapped to the code point (i) of the DCI field indicating the TCI state for the PUSCH.

In the present example, the maximum number of UL TCI states is 64, and the TCI state ID field has 6 bits. The size of the TCI state ID field may be another number. For example, the maximum number of UL TCI states may be 128, and the TCI state ID field may have 7 bits.

<<Notification Method 1-2>>

The new MAC CE may be a MAC CE for multi TRP PUSCH transmission based on the multi DCI.

The new MAC CE may conform to any one of the following options 1 and 2.

[Option 1]

The CORESET pool ID may be included in the MAC CE. When the CORESET pool ID is set to 0, the MAC CE may be applied to the PUSCH scheduled by the CORESET pool ID being equal to 0. When the CORESET pool ID is set to 1, the MAC CE may be applied to the PUSCH scheduled by the CORESET pool ID being equal to 1.

Other features may be similar to those of notification method 1-1.

Example 1

Figure 4A:
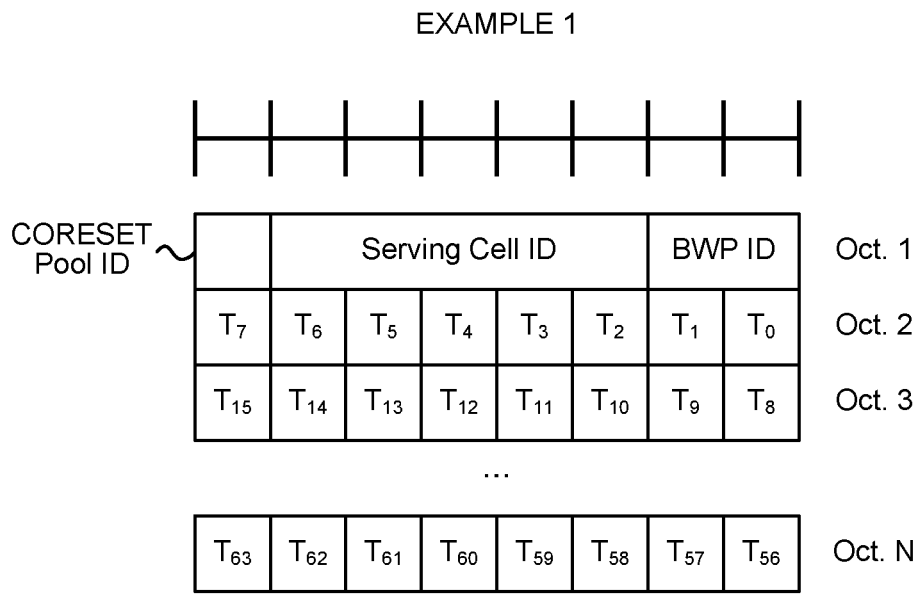
FIGS. 4A and 4B are each a diagram to show an example of a MAC CE of notification method 1-2.

In the example of FIG. 4A, the MAC CE includes a CORESET pool ID field, a serving cell ID field, a BWP ID field, and a $T_i$ field.

Example 2

Figure 4B:
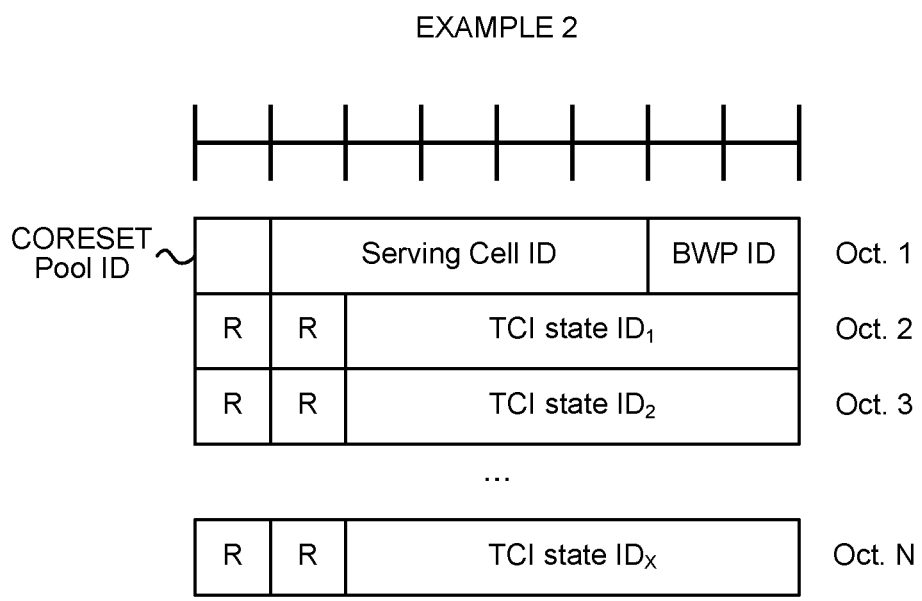

In the example of FIG. 4B, the MAC CE includes a CORESET pool ID field, a serving cell ID field, a BWP ID field, an R field, and a TCI state $ID_i$ field.

[Option 2]

The new MAC CE may reuse notification method 1-1. In this case, the same set of TCI states may be activated for the PUSCH scheduled by a different CORESET pool ID.

<<Notification Method 1-3>>

The new MAC CE may be a MAC CE for multi TRP PUSCH transmission based on the single DCI.

For the multi TRP PUSCH transmission based on the single DCI, the MAC CE may activate X combinations of TCI states for the PUSCH out of the TCI states configured using RRC. The activated combinations of TCI states may be mapped to code points of the DCI field indicating the PUSCH TCI.

Each combination may include Y TCI states. One combination of TCI states may be used for PUSCH transmission based on the multi TRP. Here, each TCI state may correspond to PUSCH transmission to each TRP.

The maximum number of activated combinations of TCI states for the PUSCH may be defined in a specification. For example, the maximum number of TCI states activated may be 2, 4, 8, or a number other than these.

The number of TCI states in each combination mapped to the DCI code point may be defined in a specification.

In the example of FIG. 5, the MAC CE includes an R field, a serving cell ID field, a BWP ID field, a $C_i$ field, and a TCI state $ID_{i,j}$ field.

The $C_i$ field indicates whether or not there is an octet including the TCI state $ID_{i,2}$ field. The TCI state $ID_{i,1}$ field and the TCI state $ID_{i,2}$ field may each indicate the TCI state that is activated and is mapped to the code point (i) of the DCI field indicating the TCI state for the PUSCH.

In the present example, the maximum number of UL TCI states is 64, and the TCI state ID field has 6 bits. The size of the TCI state ID field may be another number. For example, the maximum number of UL TCI states may be 128, and the TCI state ID field may have 7 bits.

In the present example, each DCI code point may be mapped to two TCI states (one combination of TCI states). The number of TCI states mapped to each DCI code point may be another number Y.

According to the first embodiment described above, the TCI states can be appropriately indicated for the PUSCH.

Second Embodiment

The same MAC CE may be used for activation/deactivation of the TCI states applied to both of the PDSCH and the PUSCH.

The MAC CE of Rel. 16 for PDSCH TCI activation may be reused. Indication in the MAC CE may be applied to both of the PDSCH and the PUSCH.

A new MAC CE for TCI activation may be introduced. Indication in the MAC CE may be applied to both of the PDSCH and the PUSCH.

Activation/deactivation of the TCI states for PUSCH transmission may conform to at least one of the following notification methods 2-1 to 2-5. Single TRP PUSCH transmission may be PUSCH transmission using systems of Rel. 15.

<<Notification Method 2-1>>

For the single TRP PUSCH transmission, the TCI states activation/deactivation for UE-specific PDSCH MAC CE (FIG. 1) may be reused.

When the $T_i$ field is set to 1, it may be indicated that the TCI state having TCI state ID i is activated and is mapped to a DCI code point indicating the TCI state for the PUSCH. The first TCI state with the $T_i$ field being set to 1 may be mapped to code point value 0. The n-th TCI state with the $T_i$ field being set to 1 may be mapped to code point value n−1.

When the number of TCI states configured for the PUSCH is smaller than the number of TCI states configured for the PDSCH, first X $T_i$ fields may be applied to the PUSCH. X may be the number of TCI states configured for the PUSCH.

When the maximum number of TCI states activated for the PUSCH is smaller than the number of TCI states activated for the PDSCH, first X $T_i$ fields being set to 1 may indicate the TCI states activated for the PUSCH. X may be the maximum number of TCI states activated for the PUSCH.

Figure 6:
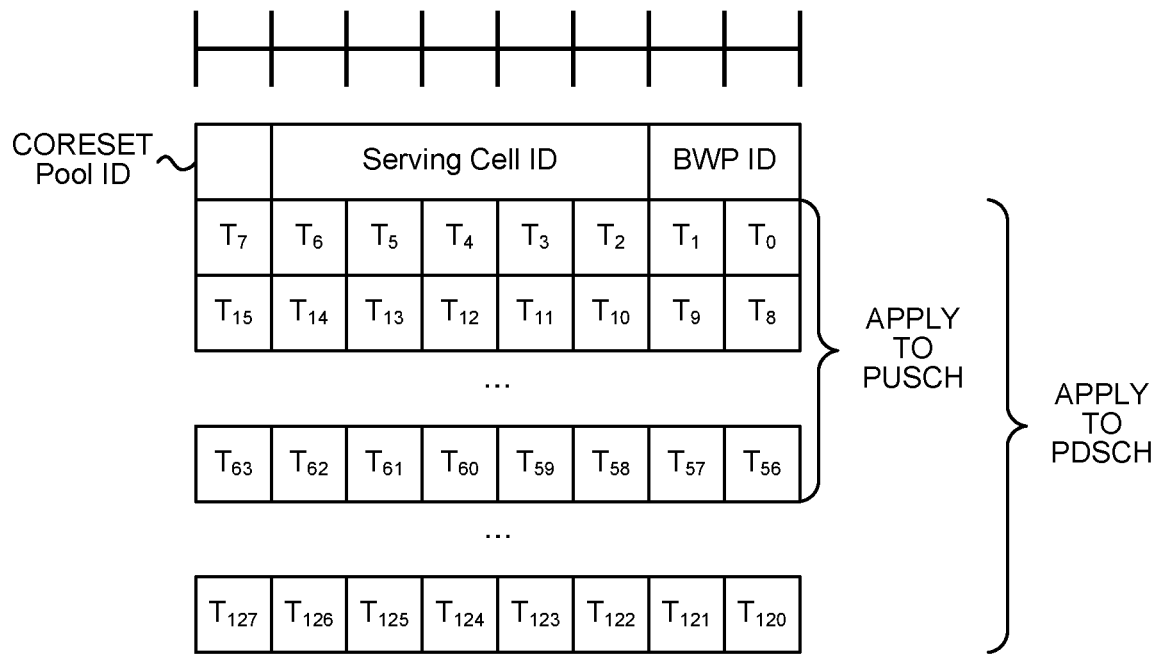
FIG. 6 is a diagram to show an example of a MAC CE of notification method 2-1.

In the example of FIG. 6, a CORESET pool ID field, a serving cell ID field, a BWP ID field, and a $T_i$ field are included. In the present example, the number of TCI states configured for the PDSCH may be 128, the number of TCI states configured for the PUSCH may be 64, and first 64 $T_i$ fields may be applied to the PUSCH.

<<Notification Method 2-2>>

For the multi TRP PUSCH transmission based on the multi DCI, the TCI states activation/deactivation for UE-specific PDSCH MAC CE (FIG. 1) may be reused. Other features may be similar to those of notification method 2-1.

The MAC CE may conform to any one of the following options 1 and 2.

[Option 1]

When the CORESET pool ID is set to 0, the MAC CE may be applied to the PUSCH scheduled by the CORESET pool ID being equal to 0. When the CORESET pool ID is set to 1, the MAC CE may be applied to the PUSCH scheduled by the CORESET pool ID being equal to 1.

[Option 2]

Only when the CORESET pool ID is set to 0, the MAC CE may be applied to the PUSCH. In this case, the same set of TCI states may be activated for the PUSCH scheduled by a different CORESET pool ID.

Variations

There may be a plurality of sets of $T_i$ fields, and respective sets may correspond to CORESET pool IDs, respectively.

The MAC CE may include a P field. When the P field is set to 1, there may be a second set of $T_i$ fields. Otherwise, the second set of $T_i$ fields may be absent.

Figure 7:
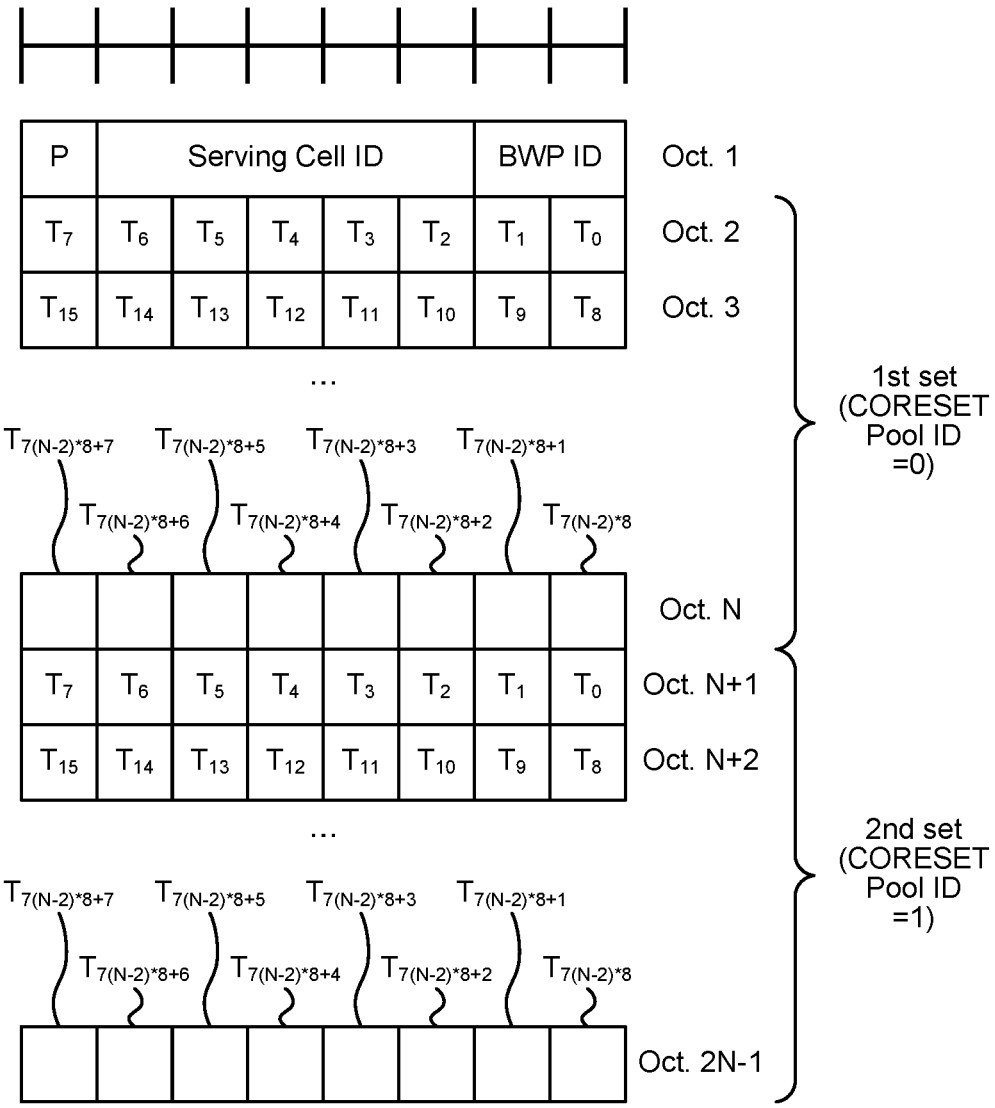
FIG. 7 is a diagram to show an example of a MAC CE of notification method 2-2.

In the example of FIG. 7, the MAC CE includes a P field, a serving cell ID field, a BWP ID field, and a $T_i$ field. In the present example, the P field is set to 1, and the MAC CE includes the first set of $T_i$ fields and the second set of $T_i$ fields. The first set of $T_i$ fields corresponds to the CORESET pool ID of 0, and the second set of $T_i$ fields corresponds to the CORESET pool ID of 1.

<<Notification Method 2-3>>

For the single TRP PUSCH transmission, the enhanced TCI states activation/deactivation for UE-specific PDSCH MAC CE (FIG. 2) may be reused.

The MAC CE may conform to any one of the following options 1 and 2.

[Option 1]

The TCI state $ID_{i,1}$ field may indicate the TCI state that is activated and is mapped to the code point (i) of the DCI field indicating the TCI state for the PUSCH.

When the maximum number of TCI states activated for the PUSCH is smaller than the number of TCI state pairs activated for the PDSCH, first X TCI state $ID_{i,1}$ fields may be applied to the PUSCH. X may be the maximum number of TCI states activated for the PUSCH.

Figure 8A:
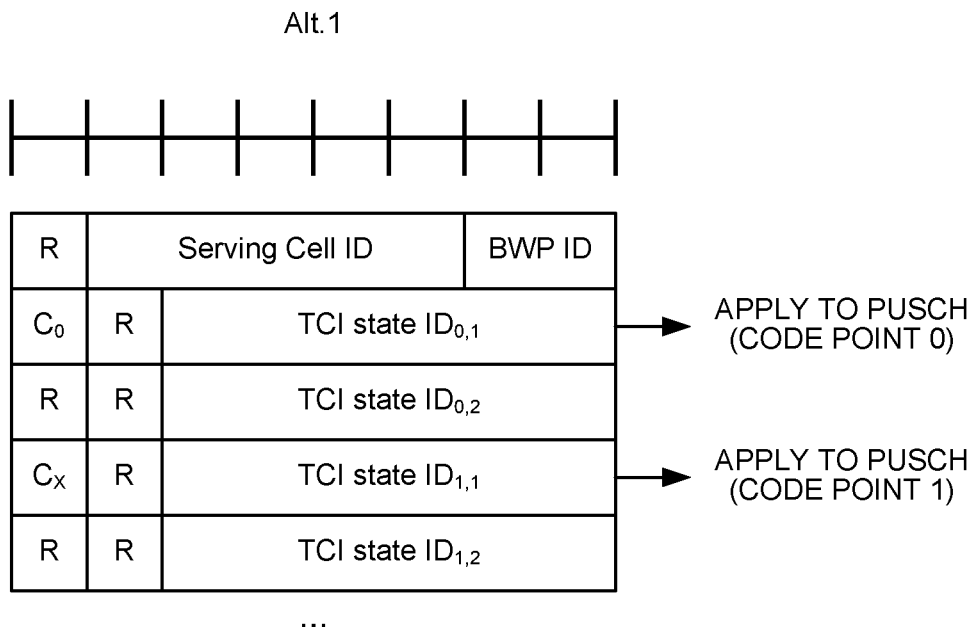
FIGS. 8A and 8B are each a diagram to show an example of a MAC CE of notification method 2-3.
Figure 8B:
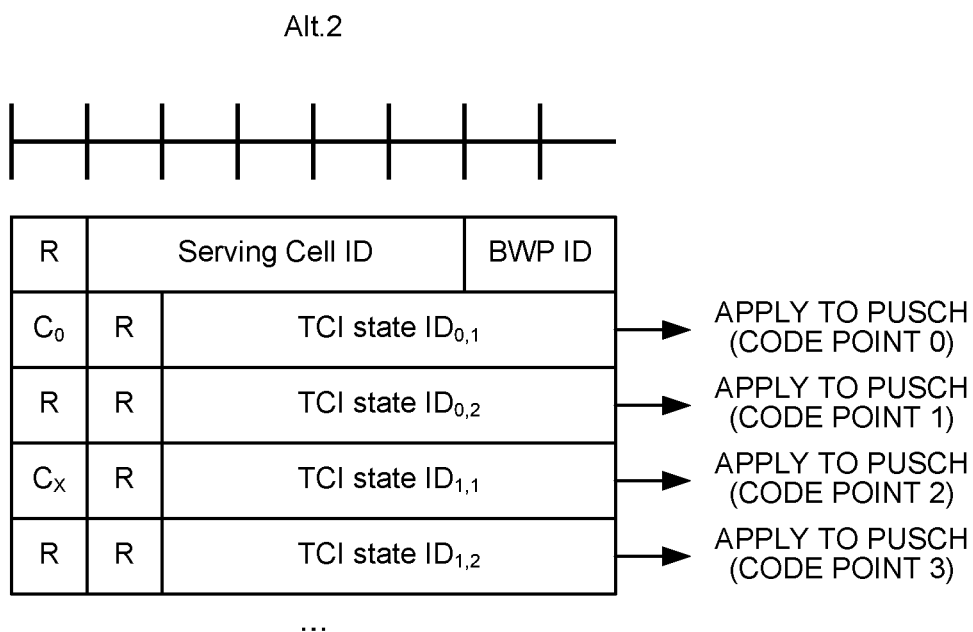

In the example of FIG. 8A, the TCI state $ID_{0,1}$ field is applied to the PUSCH and is mapped to code point 0. The TCI state $ID_{1,1}$ field is applied to the PUSCH and is mapped to code point 1.

[Option 2]

The TCI state $ID_{i,j}$ field may indicate the (j-th) TCI state that is activated and is mapped to the code point (i) of the DCI field indicating the TCI state for the PUSCH.

When the maximum number of TCI states activated for the PUSCH is smaller than the number of TCI states activated for the PDSCH, first X TCI state $ID_{i,j}$ fields may be applied to the PUSCH. X may be the maximum number of TCI states activated for the PUSCH.

In the example of FIG. 8A, the TCI state $ID_{0,1}$ field is applied to the PUSCH and is mapped to code point 0. The TCI state $ID_{0,2}$ field is applied to the PUSCH and is mapped to code point 1. The TCI state $ID_{1,1}$ field is applied to the PUSCH and is mapped to code point 2. The TCI state $ID_{1,2}$ field is applied to the PUSCH and is mapped to code point 3.

<<Notification Method 2-4>>

For the multi TRP PUSCH transmission based on the multi DCI, the enhanced TCI states activation/deactivation for UE-specific PDSCH MAC CE (FIG. 2) may be reused.

[Option 1]

The TCI state $ID_{i,1}$ field and the TCI state $ID_{i,2}$ field may each indicate the TCI state that is activated and is mapped to the code point (i) of the DCI field indicating the TCI state for the PUSCH.

When the maximum number of TCI state pairs activated for the PUSCH is smaller than the number of TCI state pairs activated for the PDSCH, first X pairs of the TCI state $ID_{i,1}$ field and the TCI state $ID_{i,2}$ field may indicate the TCI states activated for the PUSCH. X may be the maximum number of activated pairs of TCI states for the PUSCH.

<<Notification Method 2-5>>

A size (number of bits) of the field for UL-TCI state indication in UL grant DCI may depend on the number of TCI states for specific use. The TCI state for specific use may be activated by the MAC CE. The TCI state for specific use may be at least one of an active UL TCI state and a DL TCI state for the PDSCH. The UL grant DCI may be at least one of DCI formats 0_0, 0_1, and 0_2.

For example, when the number of TCI states for specific use activated in the MAC CE is N, the number of bits of the field for UL-TCI state indication may be ceil(log 2(N)).

Variations of Second Embodiment

A new MAC CE for activation of a TCI state may be introduced. Indication in the MAC CE may be applied to both of the PDSCH and the PUSCH.

Contents of the new MAC CE may be the same as those of one of notification methods 2-1 to 2-4. Different LCIDs may be used for the new MAC CE and the MAC CE of Rel. 16.

The following cases 1 and 2 may be supported, or which of the following cases 1 and 2 is supported may be configured using higher layer signaling.
[Case 1] The UE receives both of the MAC CE of Rel. 16 and the new MAC CE.
[Case 2] The UE receives both of the new MAC CEs.

According to the second embodiment described above, the TCI states can be appropriately indicated for the PDSCH and the PUSCH.

Third Embodiment

The same MAC CE may be used for activation/deactivation of the TCI states of the PDSCH and the PUSCH. Whether the MAC CE is applied to the PDSCH or the PUSCH may be based on 1-bit indication in the MAC CE.

The MAC CE of Rel. 16 for PDSCH TCI activation may be reused. Indication in the MAC CE may be applied to either the PDSCH or the PUSCH, based on the 1-bit indication.

Based on the contents of the MAC CE and the UE operation according to the second embodiment, a 1 bit in the MAC CE may indicate whether the MAC CE is applied to the PDSCH or the PUSCH.

When the bit is set to 0, the MAC CE may be applied to the PDSCH. When the bit is set to 1, the MAC CE may be applied to the PUSCH, and the UE operation according to the second embodiment may be applied to the PUSCH.

For the enhanced TCI states activation/deactivation for UE-specific PDSCH MAC CE (FIG. 2), one R field may be used as an identifier of the PDSCH or the PUSCH. When the bit of the R field is set to 0, the MAC CE may be applied to the PDSCH. When the bit is set to 1, the MAC CE may be applied to the PUSCH, and the UE operation according to notification method 2-3/2-4 may be applied to the PUSCH.

Figure 9:
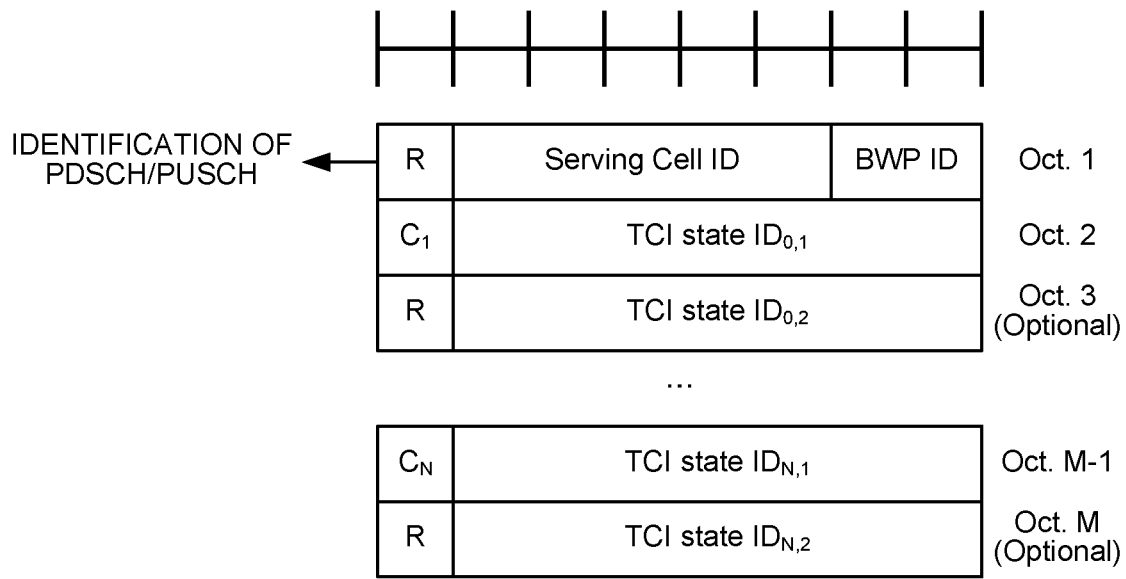
FIG. 9 is a diagram to show an example of a third embodiment.

In the example of FIG. 9, the first R field in the enhanced TCI states activation/deactivation for UE-specific PDSCH MAC CE may be used as an identifier of the PDSCH or the PUSCH.

Variations of Third Embodiment

Because the R field is not used in the TCI states activation/deactivation for UE-specific PDSCH MAC CE (FIG. 1), the MAC CE need not be reused and a new MAC CE may be defined.

A new MAC CE for TCI activation may be introduced. Indication in the MAC CE may be applied to either the PDSCH or the PUSCH, based on the 1-bit indication.

Based on the contents of the MAC CE and the UE operation according to any one of notification methods 2-1 to 2-4, the 1 bit in the MAC CE may indicate whether the MAC CE is applied to the PDSCH or the PUSCH. When the bit is set to 0, the MAC CE may be applied to the PDSCH. When the bit is set to 1, the MAC CE may be applied to the PUSCH, and the UE operation according to any one of notification methods 2-1 to 2-4 may be applied to the PUSCH.

Example 1

Figure 10A:
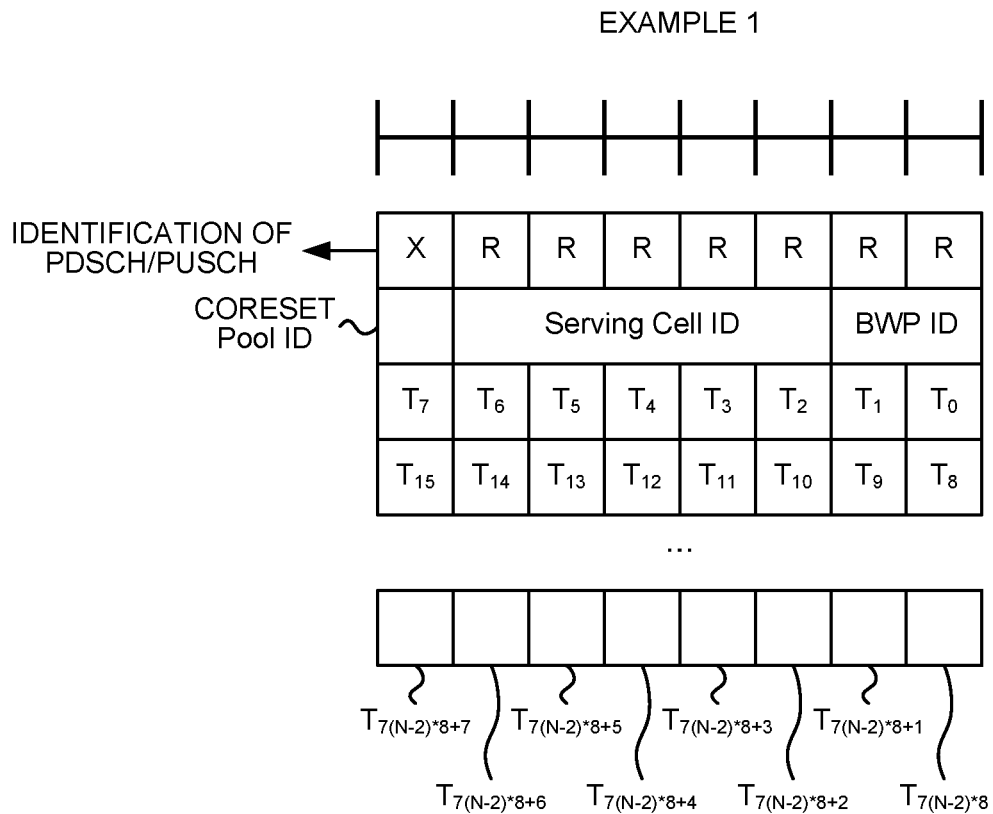
FIGS. 10A and 10B are each a diagram to show an example of a variation of the third embodiment.

In the example of FIG. 10A, a 1-bit X field may be introduced to a new MAC CE based on notification method 2-1/2-2. The X field may be an identifier of the PDSCH or the PUSCH.

Example 2

Figure 10B:
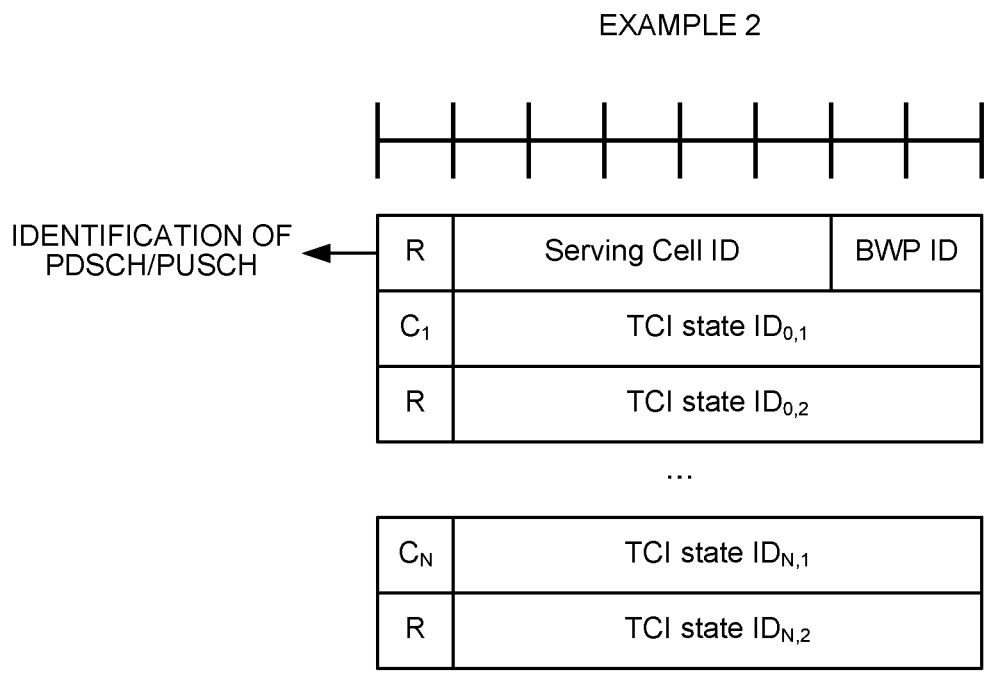

In the example of FIG. 10B, the first R field in a new MAC CE based on notification method 2-3/2-4 may be used as an identifier of the PDSCH or the PUSCH.

Different LCIDs may be used for the new MAC CE and the MAC CE of Rel. 16.

The following cases 1 and 2 may be supported, or which of the following cases 1 and 2 is supported may be configured using higher layer signaling.
[Case 1] The UE receives both of the MAC CE of Rel. 16 and the new MAC CE.
[Case 2] The UE receives both of the new MAC CEs.

According to the third embodiment described above, the TCI states can be appropriately indicated for the PDSCH and the PUSCH, using the same type of MAC CE.

Fourth Embodiment

The UE may support simultaneous TCI state activation (update) for a plurality of serving cells/BWPs.

The RRC may configure up to X applicable CC lists.

The TCI state activated for the PUSCH may be applied to all of the CCs/BWPs in the same applicable list as the CC (serving cell) indicated by the MAC CE.

Figure 11:
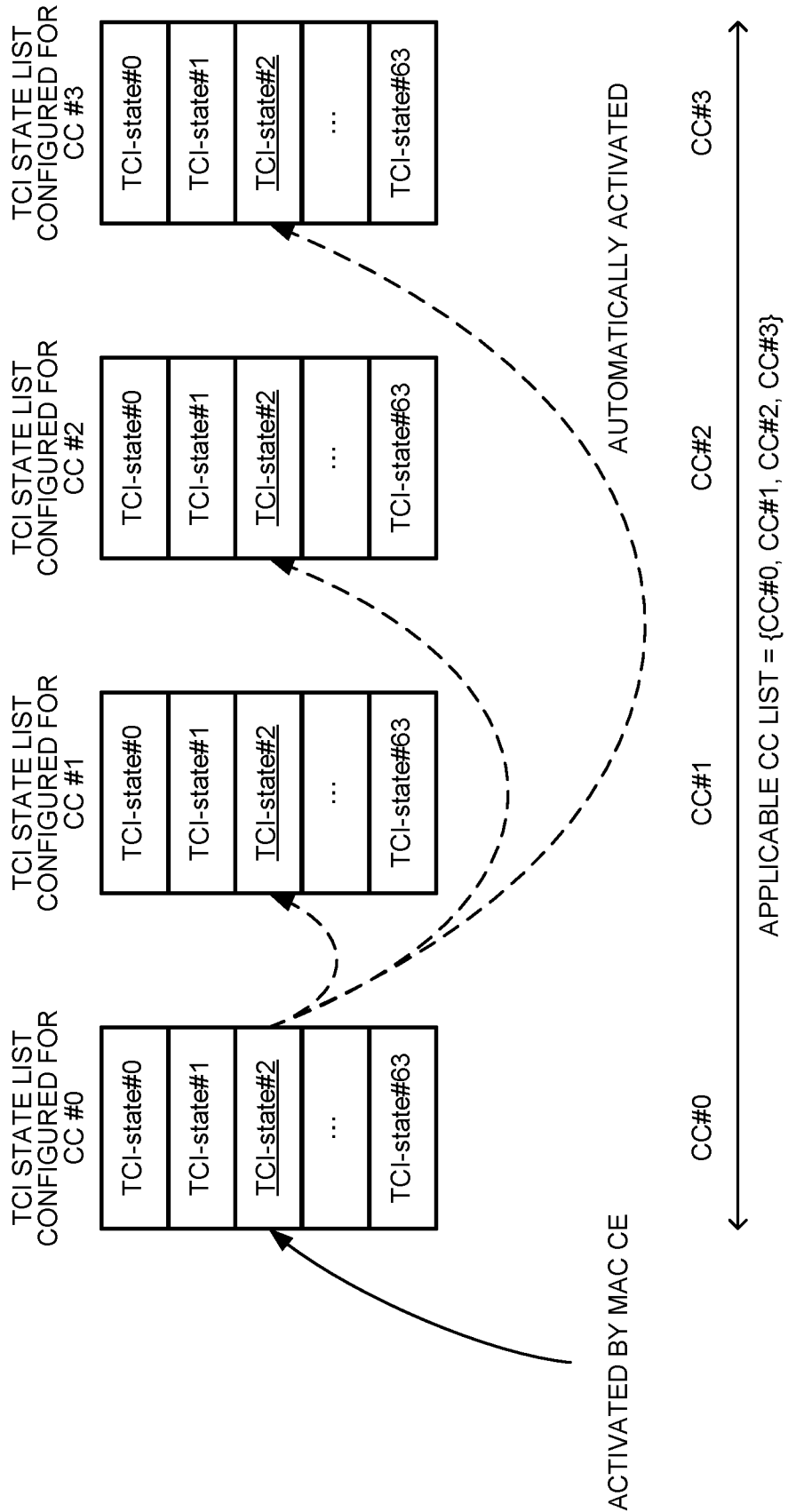
FIG. 11 is a diagram to show an example of a fourth embodiment.

In the example of FIG. 11, the UE is configured with an applicable CC list indicating CCs #0, #1, #2, and #3 and a TCI state list indicating one or more TCI states for each CC/BWP. When one TCI state of CC #0 is activated by the MAC CE, corresponding TCI states are activated in CCs #1, #2, and #3.

The simultaneous TCI state activation for a plurality of serving cells/BWPs may be applied only to the single TRP, or may be applied to the single TRP and the multi TRP.

According to the fourth embodiment described above, beam indication with low overhead and low latency can be implemented.

Fifth Embodiment

For at least one of the first to third embodiments, a UE capability indicating whether or not to support the MAC CE for PUSCH TCI state activation may be defined. Only when the corresponding UE capability is reported, at least one of the first to third embodiments may be applicable.

For at least one of the first to third embodiments, whether or not an RRC parameter (IE) and the MAC CE for PUSCH TCI state activation are enabled may be configured. Only when the corresponding RRC parameter is configured, at least one of the first to third embodiments may be applicable.

For the fourth embodiment, a UE capability indicating whether or not to support simultaneous PUSCH TCI state activation across a plurality of CCs/BWPs may be defined.

Only when the corresponding UE capability is reported, the fourth embodiment may be applicable.

According to the fifth embodiment described above, the TCI states can be appropriately indicated for the PUSCH, with compatibility with other UEs being maintained.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
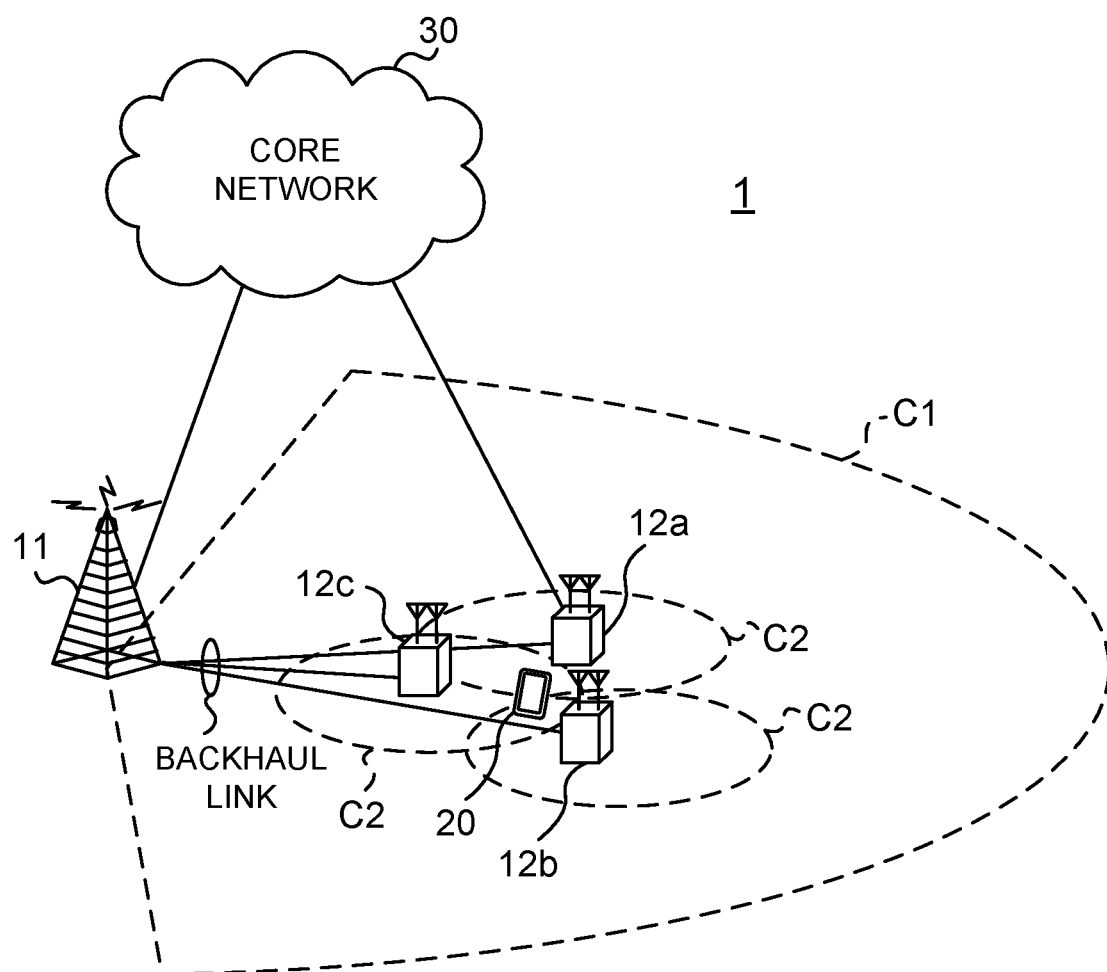
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
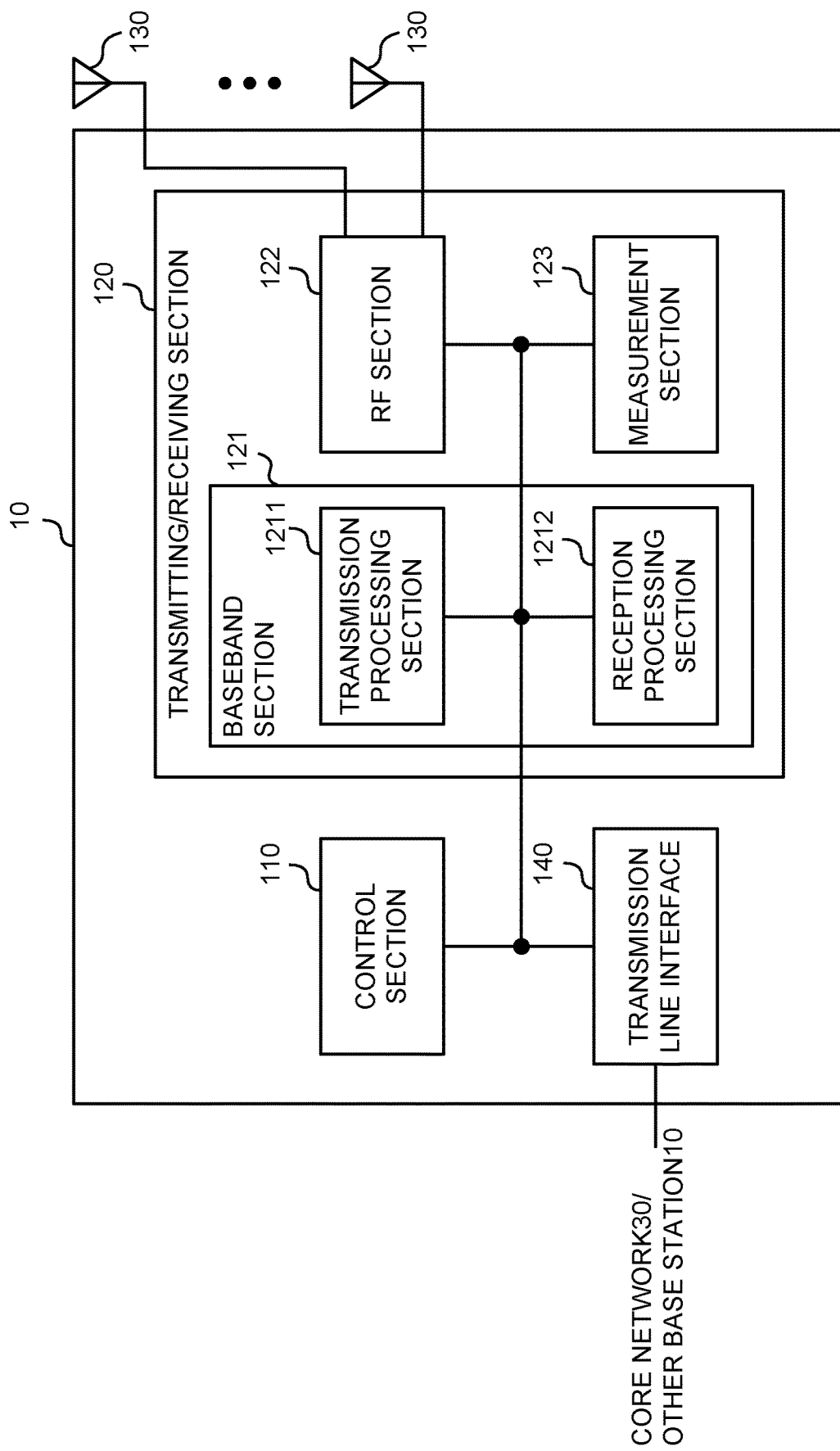
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may receive a first media access control-control element (MAC CE) indicating one or more first transmission configuration indication (TCI) states activated for a physical downlink shared channel (PDSCH) and transmit a second MAC CE indicating one or more second TCI states activated for a physical uplink shared channel (PUSCH). The control section 110 may control reception of the PUSCH to which the one or more second TCI states indicated by the second MAC CE is applied.

The transmitting/receiving section 120 may transmit a media access control-control element (MAC CE) for a physical downlink shared channel (PDSCH) and a physical uplink shared channel (PUSCH). The control section 110 may apply one or more transmission configuration indication (TCI) states indicated by the MAC CE to at least one of the PDSCH and the PUSCH.

(User Terminal)

Figure 14:
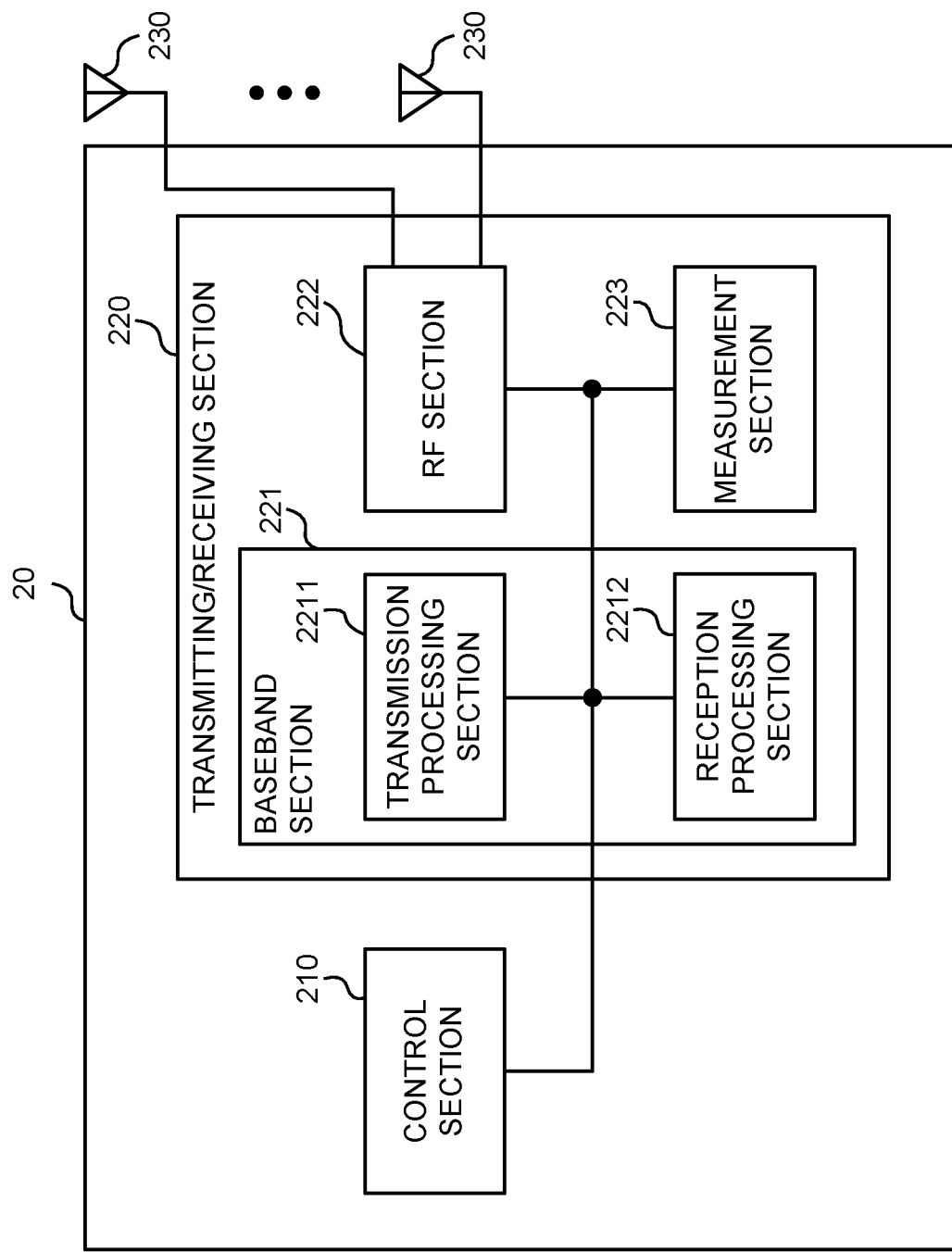
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The transmitting/receiving section 220 may receive a first media access control-control element (MAC CE) indicating one or more first transmission configuration indication (TCI) states activated for a physical downlink shared channel (PDSCH) and receive a second MAC CE indicating one or more second TCI states activated for a physical uplink shared channel (PUSCH). The control section 210 may apply the one or more second TCI states indicated by the second MAC CE to the PUSCH.

When a control resource set pool index is not configured and a plurality of TCI states are not associated with one code point for a TCI state in downlink control information, the receiving section may receive the second MAC CE.

When one or more control resource set pool indices are configured, the receiving section may receive the second MAC CE.

When a plurality of TCI states are associated with one code point for a TCI state in downlink control information, the receiving section may receive the second MAC CE.

The transmitting/receiving section 220 may receive a media access control-control element (MAC CE) for a physical downlink shared channel (PDSCH) and a physical uplink shared channel (PUSCH). The control section 210 may apply one or more transmission configuration indication (TCI) states indicated by the MAC CE to at least one of the PDSCH and the PUSCH.

When a control resource set pool index is not configured and a plurality of TCI states are not associated with one code point for a TCI state in downlink control information, the receiving section may receive the MAC CE.

When one or more control resource set pool indices are configured, the receiving section may receive the MAC CE.

When a plurality of TCI states are associated with one code point for a TCI state in downlink control information, the receiving section may receive the MAC CE.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
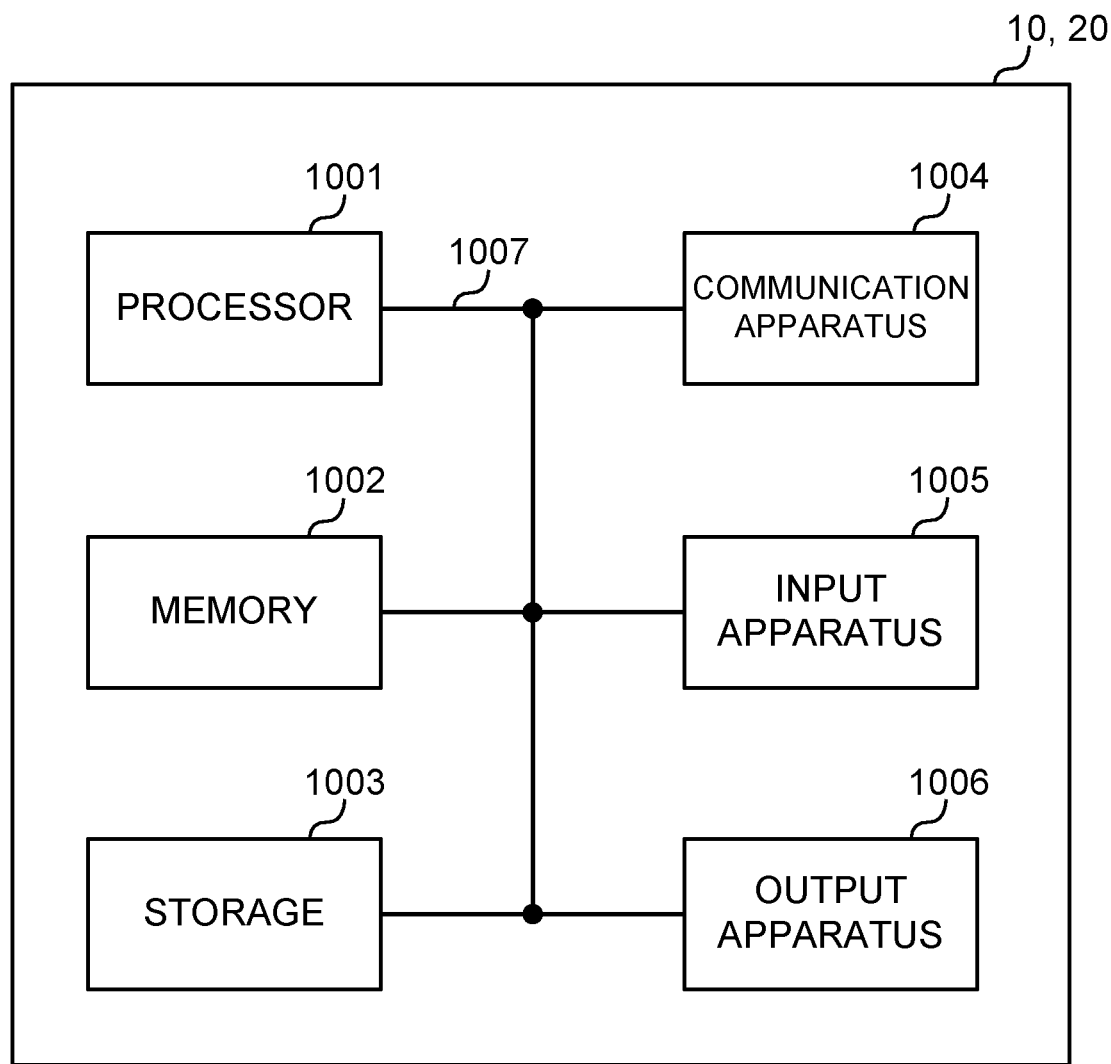
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names assigned to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a medium access control-control element (MAC CE) that is used for activation of a transmission configuration indication (TCI) state; and
   a processor that applies the TCI state indicated by the MAC CE to at least one of a physical downlink shared channel (PDSCH) and a physical uplink shared channel (PUSCH),
   wherein the processor controls, based on a value of a 1-bit field in the MAC CE, whether the TCI state indicated by the MAC CE is applied to the PDSCH or applied to the PUSCH.

2. The terminal according to claim 1, wherein the MAC CE includes a field indicating a TCI state with 7 bits.

3. The terminal according to claim 1, further comprising a transmitter that transmits capability information indicating support of the MAC CE by the terminal.

4. The terminal according to claim 1, wherein the MAC CE includes a CORESETpoolIndex field.

5. The terminal according to claim 1, wherein when the MAC CE activates a TCI state of a serving cell, the processor applies, to multiple transmission/reception points (TRPs), an operation of activating the TCI state in all component carriers (CCs) in an applicable list including the serving cell.

6. A radio communication method for a terminal, comprising:
- receiving a medium access control-control element (MAC CE) that is used for activation of a transmission configuration indication (TCI) state; and
- applying the TCI state indicated by the MAC CE to at least one of a physical downlink shared channel (PDSCH) and a physical uplink shared channel (PUSCH),
- wherein the applying includes controlling, based on a value of a 1-bit field in the MAC CE, whether the TCI state indicated by the MAC CE is applied to the PDSCH or applied to the PUSCH.

7. A base station comprising:
- a transmitter that transmits a medium access control-control element (MAC CE) that is used for activation of a transmission configuration indication (TCI) state; and
- a processor that controls transmission and reception of at least one of a physical downlink shared channel (PDSCH) and a physical uplink shared channel (PUSCH) to which the TCI state indicated by the MAC CE is applied,
- wherein the processor controls, based on a value of a 1-bit field in the MAC CE, whether the TCI state indicated by the MAC CE is applied to the PDSCH or applied to the PUSCH.

8. A system comprising a terminal and a base station, wherein
the terminal comprises:
- a receiver that receives a medium access control-control element (MAC CE) that is used for activation of a transmission configuration indication (TCI) state; and
- a processor that applies the TCI state indicated by the MAC CE to at least one of a physical downlink shared channel (PDSCH) and a physical uplink shared channel (PUSCH), and the base station comprises:
- a transmitter that transmits the MAC CE, wherein the processor controls, based on a value of a 1-bit field in the MAC CE, whether the TCI state indicated by the MAC CE is applied to the PDSCH or applied to the PUSCH.

* * * * *